(12) United States Patent
Myers et al.

(10) Patent No.: US 11,812,699 B2
(45) Date of Patent: Nov. 14, 2023

(54) CORN SILK REMOVING DEVICE

(71) Applicants: Gary R. Myers, Estherville, IA (US); Reid T. Hendrikson, Ventura, IA (US)

(72) Inventors: Gary R. Myers, Estherville, IA (US); Reid T. Hendrikson, Ventura, IA (US)

( * ) Notice: Subject to any disclaimer, the term of this patent is extended or adjusted under 35 U.S.C. 154(b) by 523 days.

(21) Appl. No.: 16/841,760

(22) Filed: Apr. 7, 2020

(65) Prior Publication Data

US 2020/0383271 A1 Dec. 10, 2020

Related U.S. Application Data

(60) Provisional application No. 62/859,242, filed on Jun. 10, 2019.

(51) Int. Cl.
| | | |
|---|---|---|
| *A23N 7/00* | (2006.01) | |
| *A01F 11/06* | (2006.01) | |
| *B02B 3/10* | (2006.01) | |
| *A23N 5/08* | (2006.01) | |

(52) U.S. Cl.
CPC .............. *A01F 11/06* (2013.01); *A23N 7/00* (2013.01); *B02B 3/10* (2013.01); *A23N 5/08* (2013.01); *A23N 2007/007* (2013.01)

(58) Field of Classification Search
CPC .. B02B 3/04; B02B 3/10; B07B 1/524; A23N 5/00; A23N 5/08; A23N 2007/007; A23N 7/00; A01F 11/06; A01F 11/00
USPC ............ 99/585, 608, 617, 626; 15/3.1, 3.16, 15/3.18, 3.19
See application file for complete search history.

(56) References Cited

U.S. PATENT DOCUMENTS

| | | | | |
|---|---|---|---|---|
| 154,924 | A | * | 9/1874 | Stevens ........................... 99/626 |
| 256,598 | A | * | 4/1882 | Rice et al. ...................... 99/626 |
| 1,029,451 | A | * | 6/1912 | McKee ................... A01F 11/06 460/46 |
| 1,116,221 | A | * | 11/1914 | Beyschlag ................ B02B 3/04 99/523 |
| 2,038,018 | A | * | 4/1936 | Wortelboer ............. A47J 17/20 99/626 |
| 2,240,503 | A | * | 5/1941 | Kettenbach ............... B02B 3/00 19/40 |
| 3,844,293 | A | * | 10/1974 | Young ..................... A01F 11/06 460/62 |
| 4,621,573 | A | * | 11/1986 | Lange .................. A23N 12/023 15/3.16 |
| 5,017,177 | A | * | 5/1991 | Mitkov ................... A01F 11/06 460/62 |
| 5,106,641 | A | * | 4/1992 | Bichel ...................... A23N 5/00 99/626 |

* cited by examiner

*Primary Examiner* — Reginald Alexander
(74) *Attorney, Agent, or Firm* — ZarleyConley PLC

(57) ABSTRACT

A corn silk removing device includes an elongated tube having a first end and a second end. Extending the length of the elongated tube, from the first end to the second end, is an opening. A rotating member having a plurality of soft bristles radially connected to a shaft extends through the elongated tube.

20 Claims, 3 Drawing Sheets

CORN SILK REMOVING DEVICE

CROSS REFERENCE TO RELATED APPLICATION

This application claims the benefit of the priority of U.S. Provisional Application No. 62/859,242 filed on Jun. 10, 2019, the contents of this application is hereby incorporated by reference in its entirety.

BACKGROUND OF THE INVENTION

The present invention is directed to a device that automatically removes corn silks from an ear of corn.

Corn silks are the fine thread like styles on an ear of corn. When preparing an ear of corn for cooking, most prefer to remove the silks from the ear. This is usually done manually either by using your hands or using a hand-held brush. While useful, this process is time consuming, particularly for large events when many ears are prepared. Therefore, a device is needed that addresses these deficiencies.

An objective of the present invention is to provide a corn silk removing device that is automated and requires minimal manual assistance.

Another objective of the present invention is to provide a corn silk removing device that takes less time to remove corn silks.

These and other objectives will be apparent to those having ordinary skill in the art based upon the following written description, drawings, and claims.

SUMMARY OF THE INVENTION

A corn silk removing device includes an elongated tube having a first end and a second end. An opening extends the length of the elongated tube from the first end and the second end. Attached to the first end and the second end are a first and a second plate. A rotatable member is operatively connected to the first and second plates. On the inner surface of the elongated tube are a pair of stops. Additionally, or alternatively, an arcuate guide member is attached to the inner surface and extends the length of the elongated tube adjacent the rotating member.

The rotating member is of any type and preferably includes a plurality of soft bristles radially attached to a shaft. A support member extends perpendicularly away from one of the plates and is adapted to support a rotary motor. The device is also supported by a pair of legs.

DETAILED DESCRIPTION OF THE PREFERRED EMBODIMENTS

Figure 1:
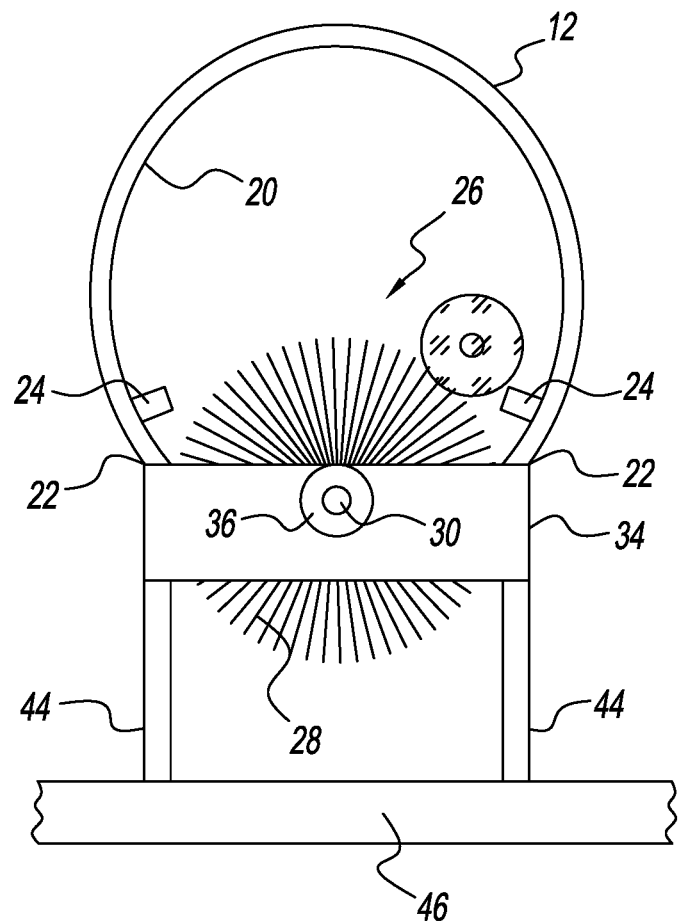
FIG. 1 is an end view of a corn silk removing device.
Figure 2:
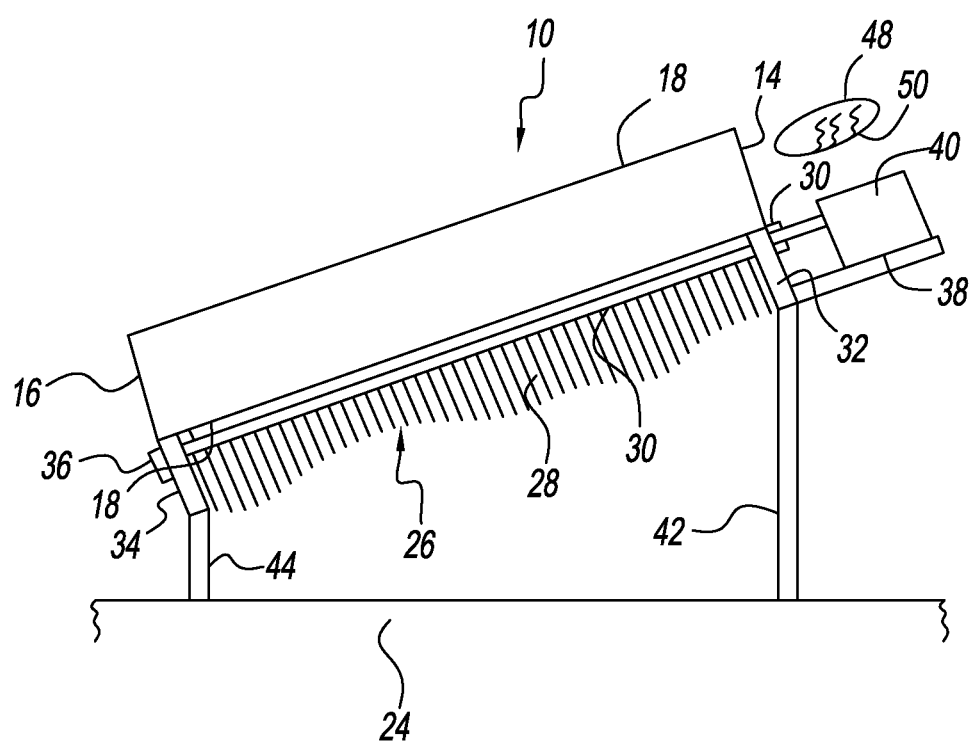
FIG. 2 is a side view of a corn silk removing device.
Figure 3:
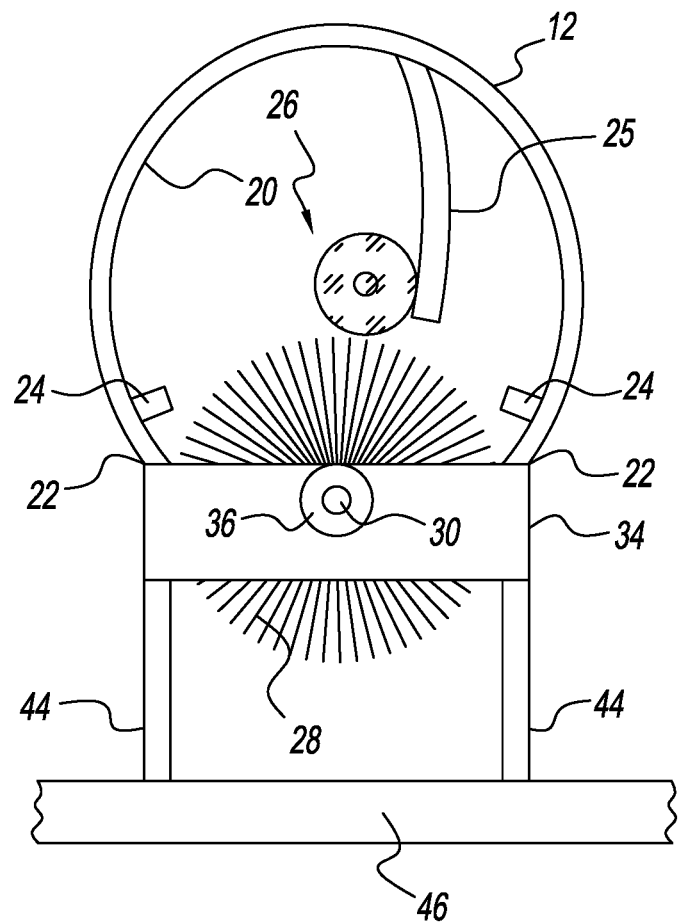
FIG. 3 is an end view of a corn silk removing device.

Referring to the Figures, a silk removing device 10 includes a hollow elongated tube 12. The tube 12 is of any size, shape and structure and preferably has a four inch diameter. Extending from a first or input end 14 to a second or discharge end 16 of the tube 12 is an elongated cut-out or opening 18. On an inner surface 20 of the tube 12, adjacent edges 22 of the opening 18, are projections or stops 24 that provides a means for the corn to run smoothly without jamming. In addition to, or alternatively, an arcuate guide member 25 is connected to the inner surface 20 of the elongated tube 12 and extends the length of the elongated tube 12 adjacent a rotating member 26.

The rotating member 26 which is partially disposed within the tube 12 is of any type such as a brush or the like. In one example, the rotating member 26 has a plurality of soft bristles 28 radially attached to a shaft 30. The shaft 30 is rotatably mounted to a first plate 32 positioned at the second end 16 below the tube 12 and extends through a second plate 34 positioned at the first end 14 below the tube 12. The shaft 30 is rotatably connected to plates 32 and 34 with bushings 36.

Extending perpendicularly away from the second plate 34 and away from the first end 14 of tube 12 is a support member 38. The support member 38 is positioned and adapted to support a rotary motor 40. The rotary motor 40 is of any type that when connected to the shaft 12 provides rotation force in either direction.

In one example the device 10 has a pair of legs 42 and 44 at each end 14 and 16. The legs 42 at the first end 14 are longer than the legs 44 at the second end 16 so that the device 10 is angled downwardly from the first end 14 to the second end 16 in relation to a support surface 46.

In operation the rotary motor 40 is connected to the shaft 30 of rotating member 26 at the first end 14 of the device. The motor 40 is activated causing the rotating member to rotate. An ear of corn 48 having corn silks 50 is inserted into the first end 14 of the tube 12. The bristles 28 of the rotating member 26 engage the ear of corn 48 removing the silks 50. The stops 24 prevent the ear of corn 48 from getting stuck between the tube 12 and the rotating member 26. The removed silks 50 are transported by the bristles 28 to the elongated cut-out 18 and fall due to gravity to the support surface 46. Gravity due to the angle of the device 10 and the rotation of the rotating member 26 cause the ear of corn 48 to be transported from the first end 14 and discharged through the second end 16.

From the above discussion and accompanying figures, it will be appreciated that the silk removing device 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A corn silk removing device, comprising:
   an elongated tube extending from an input end to a discharge end;
   an elongated cut-out extending from the input end to the discharge end along a bottom of the elongated tube;
   a rotating member partially disposed within the elongated tube through the elongated cut-out; and
   the rotating member connected to a motor;
   a pair of projections connected to an inner surface of the elongated tube adjacent a pair of edges of the elongated cut-out, wherein the pair of projections are configured to prevent jamming of the rotating member.

2. The device of claim 1 further comprising the rotating member having a plurality of bristles radially attached to a shaft, wherein a portion of the plurality of bristles are partially disposed within the elongated tube through the elongated cut-out.

3. The device of claim 1 further comprising a first plate connected to the elongated tube at the discharge end and a second plate connected to the elongated tube at the input end.

4. The device of claim 3 wherein the first plate and the second plate extends across and in a perpendicular arrangement to the elongated cut-out.

5. The device of claim 3 further comprising a shaft of the rotating member rotatably connected to the first plate and the second plate, wherein the shaft is positioned below the elongated cut-out.

6. The device of claim 5 wherein the shaft is rotatably connected to the first plate and the second plate by a pair of bushings.

7. The device of claim 5 further comprising a portion of the shaft extending beyond the second plate, in a direction opposite the first plate, and connected to the motor.

8. The device of claim 7 wherein the motor is configured to provide rotational force to the rotating member in both rotational directions.

9. The device of claim 7 further comprising a support member extending from the second plate in a direction away from the first plate and the input end of the elongated tube.

10. The device of claim 9 further comprising the motor mounted to the support member.

11. The device of claim 1 further comprising an arcuate guide member connected to the inner surface of the elongated tube above the rotating member, wherein the arcuate member extends a length between the elongated tube and the rotating member.

12. The device of claim 1 wherein the rotating member is configured to remove a plurality of corn silks from an ear of corn and drop the plurality of corn silks from the rotating member to a support surface below the rotating member due to gravity.

13. The device of claim 1 wherein the elongated tube has a diameter of four inches.

14. The device of claim 1 further comprising the pair of projects positioned equidistantly from the rotating member.

15. A corn silk removing device, comprising:
  an elongated tube having a first end and a second end and an opening that extends from the first end to the second end of the elongated tube;
  a rotating member mounted to the elongated tube and adapted to remove corn silks from an ear of corn;
  a support member that extends perpendicularly away from a second plate and away from the first end and is adapted to support a rotary motor; and
  a pair of legs connected to the first end and the second end of the elongated tube, wherein one of the pair of legs is shorter in length than the other pair of legs so that the elongated tube is positioned at an angle in relation to a support surface.

16. The device of claim 15 wherein the elongated tube has a pair of stops on an inner surface of the elongated tube.

17. The device of claim 15 wherein an arcuate guide is positioned within the elongated tube adjacent the rotating member.

18. The device of claim 15 wherein a first plate is mounted to the first end of the elongated tube and the second plate is mounted to the second end of the elongated tube and the rotating member is operatively connected to both the first plate and the second plate.

19. A corn silk removing device, comprising:
  an elongated tube extending from an input end to a discharge end;
  an elongated cut-out extending from the input end to a discharge end along a bottom of the elongated tube;
  a rotating member partially having a plurality of bristles radially attached to a shaft, wherein a portion of the plurality of bristles are partially disposed within the elongated tube through the elongated cut-out;
  a first plate connected to the elongated tube at the discharge end;
  a second plate connected to the elongated tube at the input end;
  the shaft of the rotating member rotatably connected to the first plate and the second plate by a pair of bushings, wherein the shaft is positioned below the elongated cut-out;
  a support member extending from the second plate in a direction away from the first plate and the input end of the elongated tube;
  a portion of the shaft extending beyond the second plate, in a direction opposite the first plate, and connected to a motor that is mounted to the support member; and
  wherein the rotating member is configured to remove a plurality of corn silks from an ear of corn and drop the plurality of corn silks from the rotating member below the rotating member due to gravity;
  wherein the input end is configured to receive the ear of corn having the plurality of corn silks and the discharge end is configured to discharge the ear of corn without the plurality of corn silks.

20. The device of claim 19 further comprising a pair of legs connected to the first end and the second end of the elongated tube, wherein one of the pair of legs is shorter in length than the other pair of legs so that the elongated tube is positioned at an angle in relation to a support surface.

* * * * *